UNITED STATES PATENT OFFICE.

ABEL BREAR, OF SAUGATUCK, CONNECTICUT.

PROCESS OF MANUFACTURING SUGAR.

SPECIFICATION forming part of Letters Patent No. 260,740, dated July 11, 1882.

Application filed October 2, 1878. Renewed October 16, 1880. Again renewed June 17, 1881. Again renewed January 20, 1882.

(No specimens.)

*To all whom it may concern:*

Be it known that I, ABEL BREAR, of Saugatuck, in the county of Fairfield and State of Connecticut, have invented certain new and useful Improvements in the Process of Manufacturing Sugar; and I do hereby declare that the following is a full, clear, and exact description of the invention, which will enable others skilled in the art to which it appertains to make and use the same.

My invention relates to the treatment of saccharine liquids in the manufacture of sugar as obtained from the sugar-cane, also to the treatment of sweets; and it consists in treating the liquid with bicarbonate of soda and borax, or their chemical equivalents, for arresting the acidification and fermentation and for assisting and increasing granulation, the borax arresting fermentation and the bicarbonate arresting the acidification and assisting and increasing the granulation. The juice of the cane is extracted in any of the well-known ways and subsequently defecated, after which it is clarified. These several steps are so well known to all persons skilled in the art that it would be superfluous to enumerate the steps in detail in this specification, and especially so since my invention has no reference to changes in the general manipulation of the liquid, but only to the granulation and to the arrest of fermentation and acidification in the liquids by the use of bicarbonate of soda and borax. After the saccharine liquid has been placed in the clarifier I therein treat it with bicarbonate of soda and borax. I first make a solution by dissolving bicarbonate of soda and borax, in the proportion of one pound of the former to one ounce of the latter, in one gallon of water or the saccharine liquid. I then place this solution into the clarifier containing, say, eight hundred gallons of the saccharine juice of the cane, while the latter is warm, although it need not be warm; but when warm the granulation is accelerated. As soon as the solution is placed in the saccharine liquid and the liquid becomes heated the process of granulation commences, and almost instantaneously the formation of the globules and then the grains is noticeable; and as the treatment continues the size of the grains increases, the size whereof varying with the length of time the liquid is subjected to the action of the bicarbonate of soda and the borax.

The manipulation of the liquid while in the clarifier, as well before its introduction therein and after the removal of the grains and sirup therefrom, is the same as that ordinarily practiced, with the exception that by the use of the bicarbonate of soda and the borax the length of time of treatment is shortened and the granulation increased, the increase being, say, twenty-five per cent. or more.

Instead of defecating the liquid, it may be run direct from the mill into the clarifier or into evaporating-pans, and there treated with the bicarbonate of soda and the borax. By treating the saccharine liquid or sweets with the bicarbonate of soda and borax in an evaporator of the kind described in my application for patent therefor, I have produced perfectly-formed crystals of the size of coarse grains of sand after a six minutes treatment, and after a fifteen minutes treatment have produced crystals of three-fourths of an inch in length, half an inch in width, and one-fourth of an inch in thickness, the crystals being in the shape of blocks and prisms, and very clear in the longer treatment. The bicarbonate of soda and borax also act as a clarifier.

As already stated, the size of the grains depends upon the length of time of the treatment; and I have found the most satisfactory results from the use of the bicarbonate of soda and borax in the proportions stated; but still I do not limit myself to these proportions, for I have used the bicarbonate of soda and the borax in other proportions, sometimes the bicarbonate of soda being increased and sometimes the borax, and in all cases the results have been more satisfactory than when not used at all; and while I have used the borax by itself and the bicarbonate of soda by itself, yet the results have been different and not as satisfactory as when used together. The borax alone, which I used in quantity ranging from half a pound down to one ounce, had the effect of arresting fermentation, and the bicarbonate of soda alone, used in quantity ranging from an ounce to one pound, arrested the acidification and increased the granulation; but when the two were used together the granulation was greater than when the bicarbonate of soda was used alone, and at the same time the fermentation and acidification were arrested. The subsequent treatment of the grains thus produced is the same as the treatment of those grains produced without the use of bicarbonate of soda and borax, and therefore no description thereof will be here made.

Having described my invention, what I claim is—

1. In the treatment of saccharine liquids or sweets, the process of effecting granulation and arresting fermentation and acidification, which consists in mixing with the liquid a solution of bicarbonate of soda and borax, substantially as set forth.

2. In the treatment of saccharine liquids or sweets, the process of effecting granulation by heat and the addition of bicarbonate of soda to the liquid, substantially as set forth.

3. In the treatment of saccharine liquids or sweets for the production of sugar, the process of arresting fermentation, which consists in the addition of borax to the liquid, substantially as set forth.

In testimony that I claim the foregoing as my own I affix my signature in presence of two witnesses.

ABEL BREAR.

Witnesses:
WM. G. HENDERSON,
J. H. HERRON.